(12) United States Patent
Ko et al.

(10) Patent No.: US 11,303,402 B2
(45) Date of Patent: *Apr. 12, 2022

(54) REFERENCE SIGNAL TRANSMISSION USING MULTIPLE NUMEROLOGY

(71) Applicant: LG ELECTRONICS INC., Seoul (KR)

(72) Inventors: Hyunsoo Ko, Seoul (KR); Kijun Kim, Seoul (KR); Eunsun Kim, Seoul (KR); Suckchel Yang, Seoul (KR)

(73) Assignee: LG Electronics Inc., Seoul (KR)

( * ) Notice: Subject to any disclaimer, the term of this patent is extended or adjusted under 35 U.S.C. 154(b) by 115 days.

This patent is subject to a terminal disclaimer.

(21) Appl. No.: 16/801,427

(22) Filed: Feb. 26, 2020

(65) Prior Publication Data

US 2020/0195394 A1    Jun. 18, 2020

Related U.S. Application Data

(63) Continuation of application No. 16/404,885, filed on May 7, 2019, now Pat. No. 10,608,794, which is a continuation of application No. 15/635,868, filed on Jun. 28, 2017, now Pat. No. 10,326,566.

(60) Provisional application No. 62/371,865, filed on Aug. 8, 2016.

(51) Int. Cl.
*H04L 5/00* (2006.01)
*H04L 5/26* (2006.01)
*H04L 1/16* (2006.01)
*H04L 5/10* (2006.01)
*H04L 1/00* (2006.01)

(52) U.S. Cl.
CPC .......... *H04L 5/0007* (2013.01); *H04L 1/0083* (2013.01); *H04L 1/1671* (2013.01); *H04L 5/0048* (2013.01); *H04L 5/0098* (2013.01); *H04L 5/10* (2013.01); *H04L 5/26* (2013.01)

(58) Field of Classification Search
CPC ... H04L 5/0007; H04L 1/0083; H04L 1/1671; H04L 5/0048; H04L 5/0098; H04L 5/10; H04L 5/26
See application file for complete search history.

(56) References Cited

U.S. PATENT DOCUMENTS

| | | | |
|---|---|---|---|
| 2016/0029351 A1* | 1/2016 | Shimezawa | H04W 72/042 370/329 |
| 2017/0118055 A1* | 4/2017 | Guey | H04L 27/26025 |
| 2017/0331577 A1* | 11/2017 | Parkvall | H04B 7/0848 |
| 2017/0332359 A1* | 11/2017 | Tsai | H04W 72/0446 |
| 2019/0158331 A1 | 5/2019 | Pawar | H04L 5/0051 |

* cited by examiner

*Primary Examiner* — Fayyaz Alam
(74) *Attorney, Agent, or Firm* — Dentons US LLP

(57) ABSTRACT

A method and a device for transmitting reference signals in a wireless communication system are disclosed. For these, a sequence is acquired to be used for the reference signals, and the reference signals are transmitted through subframes comprising a first type subframe and a second type subframe. Here, the first type subframe includes a first number of OFDM symbols and the second type subframe includes a second number of OFDM symbols. And, a first position of OFDM symbol for transmitting the reference signals at the first type subframe is the same as a second position of OFDM symbol for transmitting the reference signals at the second type subframe.

10 Claims, 10 Drawing Sheets

REFERENCE SIGNAL TRANSMISSION USING MULTIPLE NUMEROLOGY

CROSS-REFERENCES

This application is a continuation application of U.S. patent application Ser. No. 16/404,885, filed on May 7, 2019, which is a continuation application of U.S. patent application Ser. No. 15/635,868, filed on Jun. 28, 2017 (now issued as U.S. Pat. No. 10,326,566), which claims the benefit of U.S. Provisional Application No. 62/371,865, filed on Aug. 8, 2016, which is hereby incorporated by reference as if fully set forth herein.

BACKGROUND OF THE INVENTION

Field of the Invention

The present invention relates to a method of transmitting and receiving a reference signal having a flexible structure according to a system environment in a wireless communication system and an apparatus therefor.

Discussion of the Related Art

Recently, standardization of mobile communication technology has reached studies on 5th Generation (5G) mobile communication via 4th Generation (4G) mobile communication technology such as LTE and LTE-A. In 3GPP, 5G mobile communication is referred to as New Radio (NR).

It is apparent that design requirements of an NR system up to now are considerably diverse. For example, a used frequency band ranges from 700 MHz to 70 GHz, system bandwidth ranges from 5 MHz to 1 GHz, and mobile velocity ranges from 0 km/h to 500 km/h. In addition, a use environment demands support for various situations such as an indoor environment, an outdoor environment, and a large cell.

In a situation in which the above-described various requirements are demanded, the most general design direction is to design a system on the assumption of the worst of the above various environments. This is identically applicable to transmission of a Demodulation Reference Signal (DMRS), which is a reference signal used to demodulate data and/or control information.

However, design of an NR DMRS using a single pattern on the assumption of an extreme environment may be considerably inefficient in terms of resource efficiency. On the other hand, design of the NR DMRS using various patterns is problematic in that implementation complexity increases.

To solve this problem, the following explanation is for the wireless communication system using multiple numerology at the same time. That is, various types of subframes including different numbers of OFDM symbols and subcarriers can be used at the same time. In this situation, methods for transmitting DMRS efficiently will be discussed.

In addition, to solve the above-described problem, a description will be given of a scheme of transmitting and receiving a variable RS using a DMRS, wherein the DMRS is hierarchically divided into a basic DMRS and an additional DMRS.

SUMMARY OF THE INVENTION

Accordingly, the present invention is directed to a method of transmitting and receiving a reference signal having a flexible structure according to a system environment in a wireless communication system and an apparatus therefor that substantially obviates one or more problems due to limitations and disadvantages of the related art.

To meet the above object, in one aspect of the present invention, a method for transmitting reference signals in a wireless communication system is provided, the method comprising: acquiring a sequence to be used for the reference signals; and transmitting the reference signals through subframes comprising a first type subframe and a second type subframe, wherein the first type subframe includes a first number of OFDM symbols and the second type subframe includes a second number of OFDM symbols, and wherein a first position of OFDM symbol for transmitting the reference signals at the first type subframe is the same as a second position of OFDM symbol for transmitting the reference signals at the second type subframe.

The first type subframe and the second type subframe can be multiplexed with a FDM (frequency divisional multiplexing) scheme, and, in this case, the first position and the second position are the same position in a time domain.

The first type subframe and the second type subframe can be multiplexed with a TDM (time divisional multiplexing) scheme, and, in this case, the first position and the second position are first OFDM symbols respectively in the first type subframe and the second type subframe.

Here, the first type subframe and the second type subframe may have different subcarrier spacing.

Preferably, a number of the reference signals transmitted through the second type subframe may be more than a number of the reference signals transmitted through the first type subframe, if the subcarrier spacing of the second type subframe is larger than the subcarrier spacing of the first type subframe.

In one example, the first and the second positions can be determined based on a first number of OFDM symbols for transmitting data over a second number of OFDM symbols for transmitting the reference signals.

The sequences can be generated based on one of the first type subframe and the second type subframe which has a smallest subcarrier spacing.

Preferably, the reference signals to be transmitted through the first type subframe may be acquired based on the generated sequence and the reference signals to be transmitted through the second type subframe may be acquired based on a subsequence of the generated sequence, if the subcarrier spacing of the second type subframe is larger than the subcarrier spacing of the first type subframe.

The subsequence may be acquired by subsampling the generated sequence with an interval.

The reference signals may be DMRSs (Demodulation Reference Signals), and the sequence can be generated based on an ID of the DMRS. Here, the ID of the DMRS may be different from a cell ID.

In another aspect of the present invention, an apparatus for transmitting reference signals in a wireless communication system, the apparatus comprising: a processor configured to acquire a sequence to be used for the reference signals; and a transceiver configured to transmit the reference signals through subframes comprising a first type subframe and a second type subframe, wherein the first type subframe includes a first number of OFDM symbols and the second type subframe includes a second number of OFDM symbols, and wherein the processor controls the transceiver to transmit the reference signals at a first position of OFDM symbol within the first type subframe, the first position being the same position as a second position of OFDM symbol for transmitting the reference signals at the second type subframe, is provided.

The first type subframe and the second type subframe may be multiplexed with a FDM (frequency divisional multiplexing) scheme, and, in this case, the first position and the second position are the same position in a time domain.

The first type subframe and the second type subframe may be multiplexed with a TDM (time divisional multiplexing) scheme, and, in this case, the first position and the second position are first OFDM symbols respectively in the first type subframe and the second type subframe.

The first type subframe and the second type subframe may include different subcarrier spacing.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention.

The following detailed description includes specific details in order to provide a thorough understanding of the present invention. However, it will be apparent to those skilled in the art that the present invention may be practiced without such specific details. In some instances, known structures and devices are omitted or are shown in block diagram form, focusing on important features of the structures and devices, so as not to obscure the concept of the present invention.

As described above, an aspect of the present invention provides a method of transmitting reference signals (RSs) in a situation in which subframes of various structures are mixed in a wireless communication system. The RSs may be DMRSs but may be referred to by other names For this, an embodiment proposes that a basic DMRS be transmitted through the first Orthogonal Frequency Division Multiplexing (OFDM) symbol in a data transmission region of a predetermined subframe and an additional DMRS be transmitted in the predetermined subframe according to a level determined according to a transmission environment.

Herein, characteristically, the basic DMRS is transmitted through the first OFDM symbol in a data transmission region of the predetermined subframe regardless of a transmission link, a subframe structure, and a transmission environment. The reason why the basic DMRS is transmitted through the first OFDM symbol in the data transmission region of the predetermined subframe is to aid in early decoding of data and to measure/eliminate inter-cell interference.

As described above, the basic DMRS refers to an RS which is always transmitted regardless of a link (i.e., downlink (DL)/uplink (UL)/sidelink (SL)), numerology (a subcarrier spacing or an OFDM symbol duration), a transmission layer (rank 1 to N), a deployment scenario (indoor or outdoor), velocity (0 to 500 km/h), and a Transport Block Size (TBS). It is assumed in NR that the basic DMRS is located at a front part of a data region of a subframe. In NR, early decoding of data is an important requirement of design. By transmitting the DMRS prior to a data signal, channel estimation information necessarily demanded for data decoding can be rapidly obtained.

A factor that should be considered in association with the position of the basic DMRS is a frame structure used in NR. In an NR system, it is expected that a TDD scheme will be mainly used due to a pilot contamination problem caused by introduction of massive MIMO.

Figure 1:
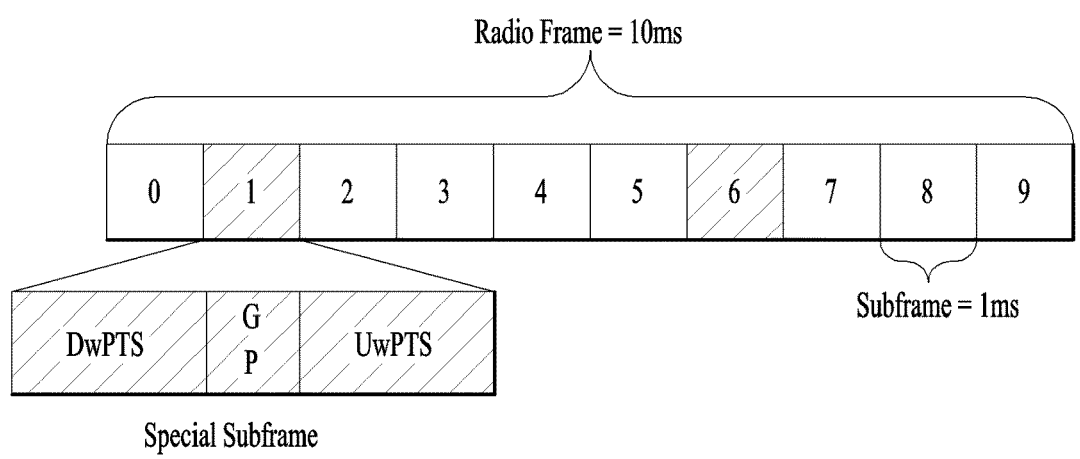
FIG. 1 is a diagram illustrating the structure of a TDD radio frame.

FIG. 1 is a diagram illustrating the structure of a TDD radio frame.

While the structure of the TDD radio frame illustrated in FIG. 1 is a radio frame structure in a 4G LTE system, the corresponding structure may be used unless particularly mentioned otherwise hereinbelow.

The TDD radio frame of the LTE system is 10 ms in length and includes 10 subframes. One subframe is 1 ms in length. In FIG. 1, special subframes such as subframe 1 and subframe 6 are subframes for DL/UL switching and each special subframe includes a DL Pilot Time Slot (DwPTS) having a length of 3 to 12 OFDM symbols, a Guard Period (GP) having a length of 1 to 10 OFDM symbols, and a UL Pilot Time Slot (UpPTS) having a length of one or two OFDM symbols.

In the structure of the 4G LTE radio frame illustrated in FIG. 1, one Transmission Time Interval (TTI) is 1 ms in length and corresponds to one subframe.

Figure 2:
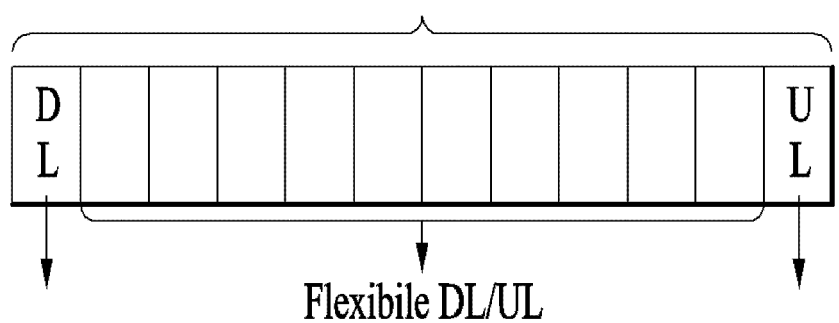
FIG. 2 is a diagram illustrating the structure of a subframe in an NR system according to an embodiment of the present invention.

FIG. 2 is a diagram illustrating the structure of a subframe in an NR system according to an embodiment of the present invention.

In a 5G mobile communication system, if communication is performed based on a TDD scheme, it is proposed that the structure of a subframe sequentially including a DL dedicated duration, a UL or DL flexible duration, and a UL dedicated duration be used as illustrated in FIG. 2. This structure can prevent a response to a signal transmitted on a link of any one direction from being excessively delayed and perform flexible communication by configuring a flexible duration according to a system situation.

The subframe structure as illustrated in FIG. 2 may be referred to as a self-contained frame structure. In such a self-contained frame structure, the DL dedicated duration may be used to transmit DL control channel information, the flexible duration may be used to transmit a data channel, and the UL dedicated duration may be used to transmit a UL control channel.

In NR, when OFDM has different numerology in an in-band, the position of a DMRS in a data transmission region in a subframe may be defined as follows.

If a subframe is configured based on a specific subcarrier spacing and OFDM symbols of different lengths including DMRSs are present in a data region of the subframe, it is desirable that the positions of DMRSs in respective OFDM symbols be equalized. For example, a first type subframe is configured by 14 OFDM symbols (15 kHz) and Symbol Index_1 of the first type subframe is defined as 0 to 13. In addition, a second type subframe is configured by 28 short OFDM symbols (30 kHz) and Symbol index_2 of the second type subframe is defined as 0 to 27. In this case, if a DMRS is located on Symbol Index_1=2, it is desirable that a DMRS be located on Symbol Index_2=4 or 5.

If a subframe is configured based on a specific subcarrier spacing and OFDM symbols having different lengths are arranged in a data region of the subframe, the position of the first DMRS in OFDM symbols having the specific subcarrier spacing may be equalized with a time position of the first DMRS in OFDM symbols having a shorter length than the OFDM symbols having the specific subcarrier spacing.

If the number of OFDM symbols including a basic DMRS in OFDM symbols having a specific subcarrier spacing is N, the number of OFDM symbols including a basic DMRS in OFDM symbols shorter than the OFDM symbols having the specific subcarrier spacing may be greater than N. For example, the number of OFDM symbols including the basic DMRS may be proportional to a subcarrier spacing. (If the number of OFDM symbols including a basic DMRS in OFDM symbols of a subcarrier spacing of 15 kHz is 1, the number of OFDM symbols including a basic DMRS in OFDM symbols of a subcarrier spacing of 30 kHz may be 2.)

If a short OFDM symbol is transmitted in a subframe including OFDM symbols having a specific subcarrier spacing and a plurality of short OFDM symbols including a basic DMRS is present, a quotient obtained by dividing the number of short OFDM symbols used as data by the number of short OFDM symbols including the basic DMRS is an interval between basic DMRS OFDM symbols. For example, if there are 20 OFDM symbols used as data and there are two short OFDM symbols including the basic DMRS, then a quotient, 10, obtained by dividing 20 by 2, is the interval between the basic DMRS OFDM symbols. If the first basic DMRS is located at Symbol Index_2=4, the second basic DMRS is located at Symbol Index_2=14.

Figure 3:
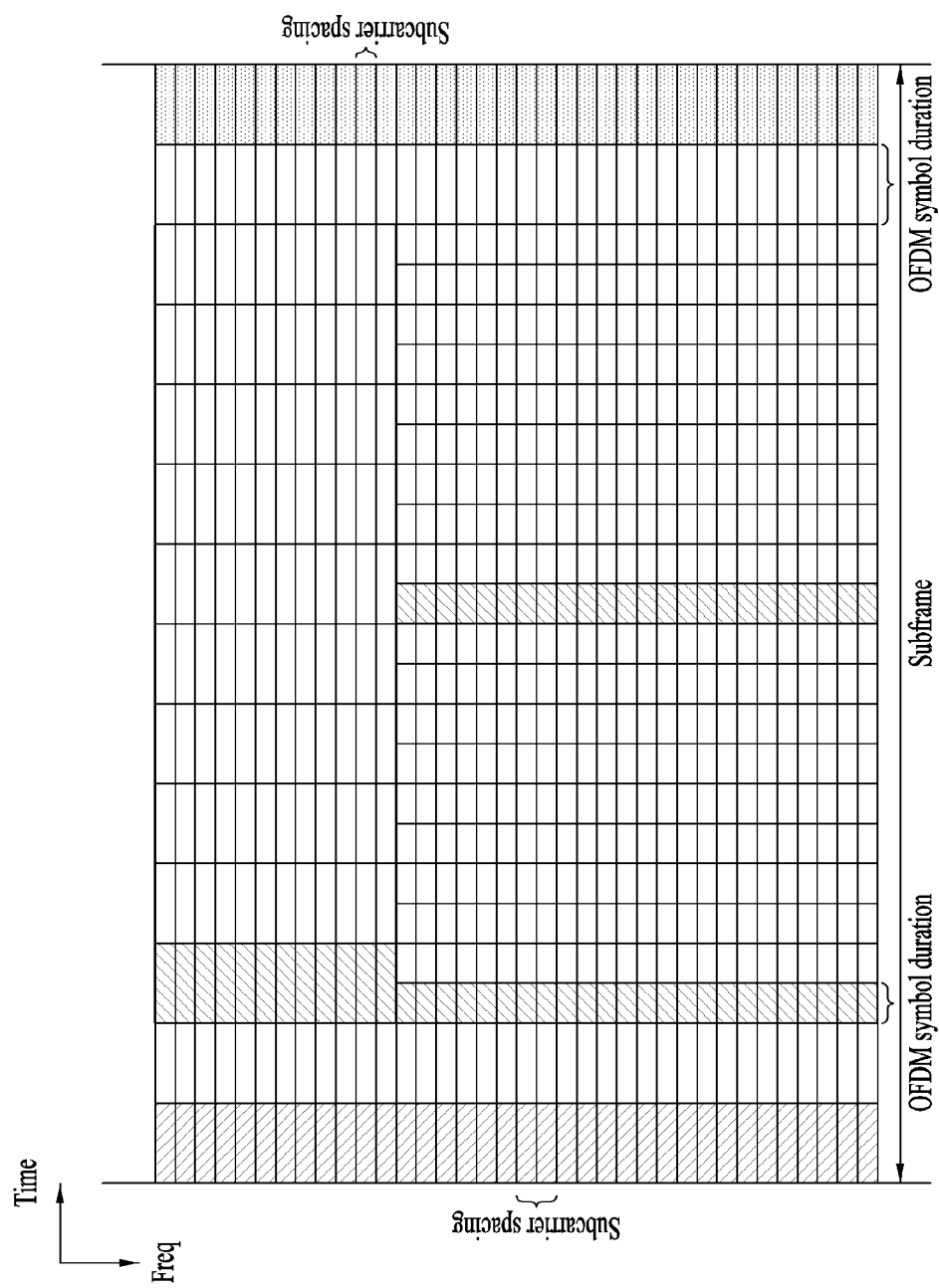
FIG. 3 illustrates the case in which subframes of two types are multiplexed in one subframe on an FDM basis.
Figure 4:
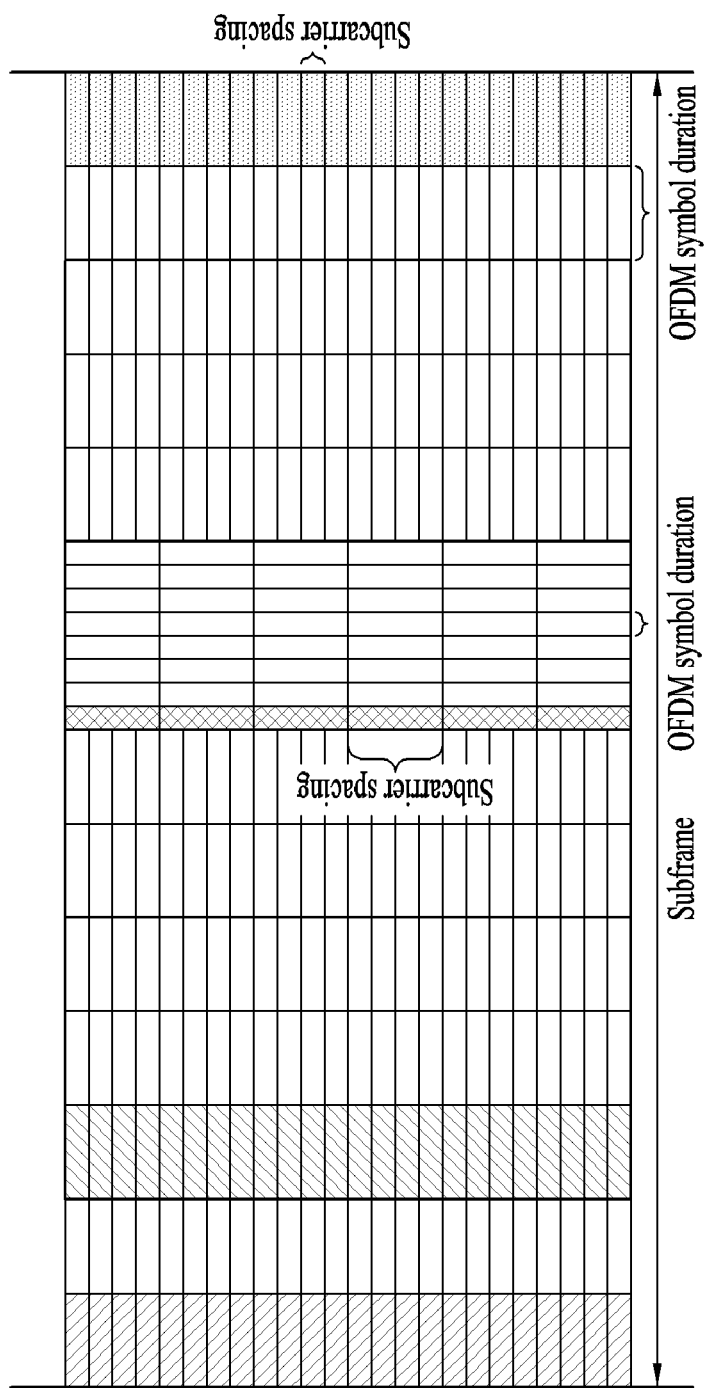
FIG. 4 illustrates the case in which subframes of different types are multiplexed on a TDM basis.

FIGS. 3 and 4 respectively show examples of present invention in an FDM situation and a TDM situation.

If short OFDM symbols are transmitted in a subframe configured by OFDM symbols having a specific subcarrier spacing, a mini-subframe including the short OFDM symbols may be defined. The mini-subframe may include at least one basic DMRS OFDM symbol and the basic DMRS OFDM symbol may be located at a start portion of the mini-subframe.

Specifically, FIG. 3 illustrates the case in which subframes of two types are multiplexed in one subframe on an FDM basis. A DMRS is transmitted through the first OFDM symbol in a data region of a first type subframe and a DMRS is also transmitted through the first OFDM symbol in a data region of a second type subframe. In FIG. 3, it is desirable that positions of OFDM symbols on which DMRSs are transmitted be identically configured.

FIG. 4 illustrates the case in which subframes of different types are multiplexed on a TDM basis. If OFDM symbols having different lengths are multiplexed based on TDM and a mini-subframe is configured by consecutive short OFDM symbols, a DMRS may be located on a starting OFDM symbol of the mini-subframe.

Meanwhile, in a situation in which subframes of various structures are mixed as described above, a sequence used for an RS is as follows.

Figure 5:
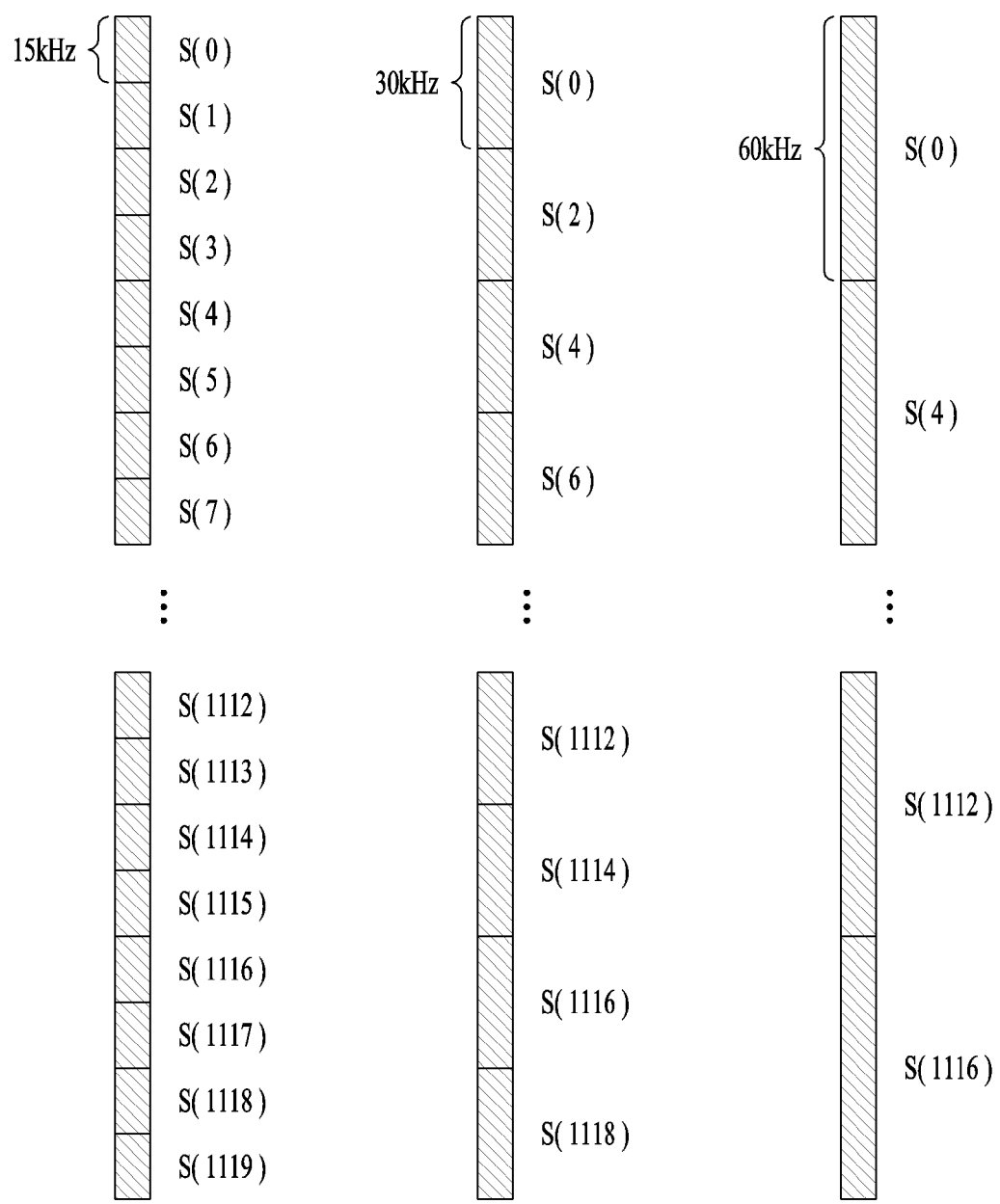
FIG. 5 shows an exemplary concept of generating sequence for a DMRS in multi-numerology situation.

FIG. 5 shows an exemplary concept of generating a sequence for a DMRS in a multi-numerology situation.

When any cell supports multiple numerology, a sequence mapped to a DMRS Resource Element (RE) may be generated based on the smallest subcarrier spacing and, when numerology is changed, a subsequence of the corresponding sequence is desirably used. If the smallest value among subcarrier spacings supported by any cell is N and a subcarrier spacing increases to a multiple of $2^M$, the subcarrier spacing SC may be represented as $N \times 2^M$ (e.g., N=15 kHz, M=0, 1, 2, 3, and SC=15 kHz, 30 kHz, 60 kHz, 120 kHz).

For example, in a situation in which the smallest subcarrier spacing supported in a band of 20 MHz is 15 kHz and 1200 REs (600 REs for 30 kHz, 300 REs for 60 kHz, and 150 REs for 120 KHz) are present, if 24 REs are configured as one Resource Block (RB), 50 RBs (25 RBs for 30 kHz, 12 or 13 RBs for 60 kHz, and 6 or 7 RBs for 120 kHz) may be generated. If different sequences are mapped to an RS, 1200 values for 15 kHz, 600 values for 30 kHz, 300 values for 60 kHz, and 150 values for 120 kHz are demanded according to numerology.

If a sequence having a length of 1200 samples is generated based on the smallest subcarrier spacing of 15 kHz, the length-1200 sequence may be subsampled in another subcarrier space used in an in-band. As illustrated in FIG. 5, 600 samples obtained by performing 2-interval subsampling may be used in 30 kHz, 300 samples obtained by performing 4-interval subsampling may be used in 60 kHz, and 150 samples obtained by performing 8-interval subsampling may be used in 120 kHz.

If a plurality of OFDM symbols having a wide subcarrier spacing is used for RSs in an OFDM symbol duration having a narrow subcarrier spacing, the same base sequence (a sequence stream subsampled from a sequence stream generated based on the smallest numerology) is used in the plural OFDM symbols.

As a seed value of a sequence, a new ID applied to a DMRS (e.g., DMRS-ID) may be defined and used. The new ID may be a value which is not tied with a cell-ID. A UE may be informed of a value of a DMRS-ID used for a DMRS for decoding data thereof and informed of a DMRS-ID of an interference channel in order to estimate a channel of a neighbor link or a neighbor cell (or TRP).

Basic DMRS/Additional DMRS Scheme

A factor that should be considered in association with the position of a basic DMRS is that a frame structure in NR is designed for the purpose of commonly using DL/UL/SL and DMRS positions of DL/UL/SL should be equalized in a subframe in order to estimate a channel of an interference signal received from a neighbor cell or a neighbor link.

Figure 6:
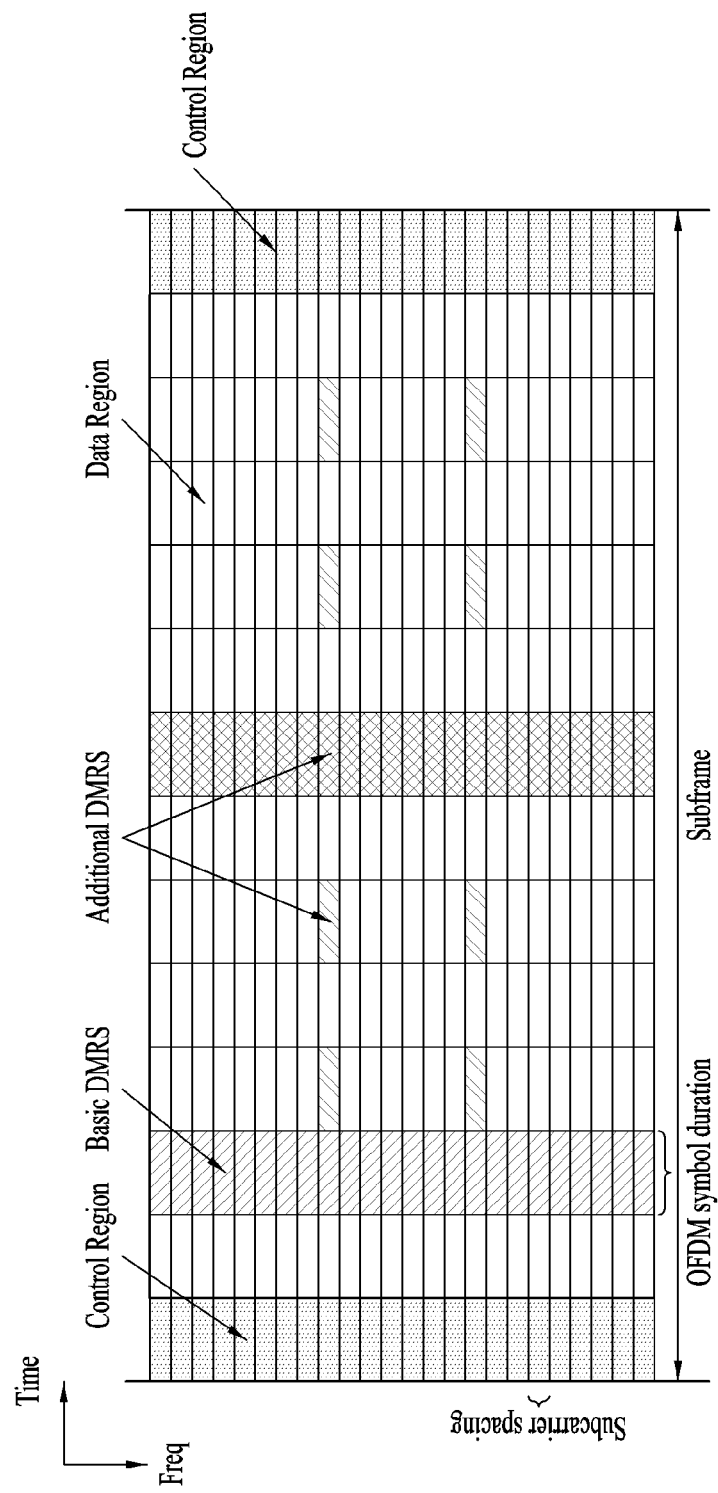
FIGS. 6 and 7 are diagrams for explaining a method of transmitting a basic DMRS and an additional DMRS according to an embodiment of the present invention.
Figure 7:
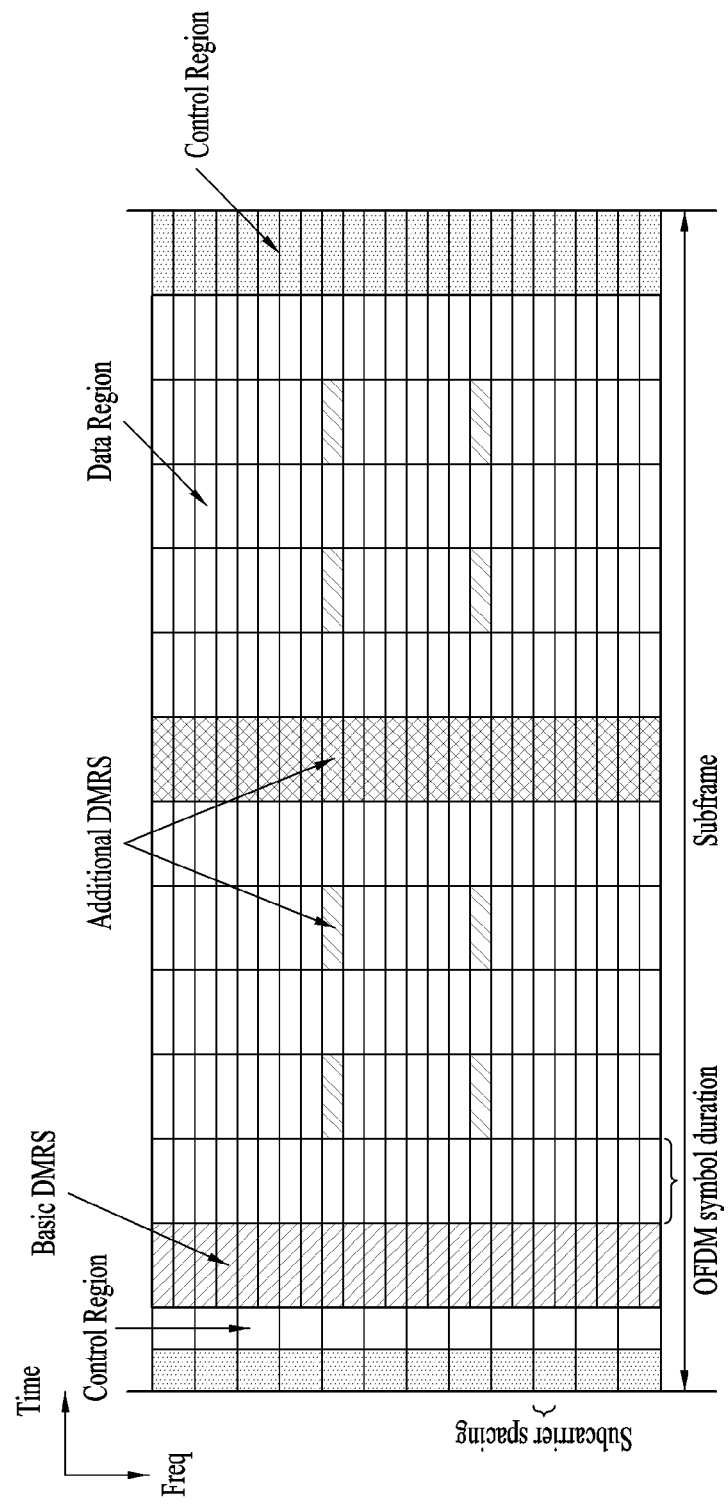

FIGS. 6 and 7 are diagrams for explaining a method of transmitting a basic DMRS and an additional DMRS according to an embodiment of the present invention.

As illustrated in FIGS. 6 and 7, in a subframe structure considered in NR, starting points of a DL data region and a UL data region may differ according to the length of a DL control region and presence of a guard period.

For example, if DL data is transmitted subsequently to the first OFDM symbol on which a control channel is transmitted, a data region may be started beginning from the second OFDM symbol. If UL data is transmitted subsequently to the first OFDM symbol on which the control channel is transmitted, the second OFDM symbol may be used as a guard period and data may be transmitted starting from the third OFDM symbol.

Thus, since the starting points of the DL data and the UL data may differ, it is desirable to deploy the basic DMRS on the first symbol among OFDM symbols commonly used for data transmission in a DL data region and a UL data region. FIG. 6 illustrates transmission of the basic DMRS on the third OFDM symbol according to the above-described principle.

Meanwhile, the length of OFDM symbols of a control region and the length of OFDM symbols of a data region may differ. Even in this case, similarly to the foregoing example, the basic DMRS may be deployed on the first OFDM symbol among OFDM symbols commonly used for data transmission in the DL data region and the UL data region after OFDM symbols occupied by the DL control region and a guard time. For example, FIG. 7 illustrates the DL control region and the guard time configured both on the first OFDM symbol. Herein, the basic DMRS may be transmitted on the second OFDM symbol.

The additional DMRS may be located at a specific position of the data region and may be divided into two types as follows.

(1) Type-1 additional DMRS: This type means a DMRS using a part of REs.

(2) Type-2 additional DMRS: This type means a DMRS using all of one OFDM symbol.

If the additional DMRS is used in units of OFDM symbols (if Type-2 DMRS is used), the additional DMRS may be deployed at a position at which the number of OFDM symbols located after an OFDM symbol used as the basic DMRS is equal or similar to the number of OFDM symbols located after an OFDM symbol used as the additional DMRS. For example, if 12 OFDM symbols are present in a data region and the basic DRMS is located on the second OFDM symbol as illustrated in FIG. 6, the additional DMRS may be deployed on the seventh OFDM symbol. As another example, if 12 OFDM symbols are present in the data region and the basic DRMS and two additional DRMSs are present, when the basic DMRS and the two additional DRMSs are delayed on the first, fifth, and ninth OFDM symbols, respectively, the numbers of OFDM symbols located after the respective DMRSs are similar to each other. This is advantageous in that DMRSs make good use of channel estimation variation.

Meanwhile, according to another embodiment of the present invention unlike the above-described embodiment, if the additional DMRS is used in units of OFDM symbols (if Type-2 DMRS is used), the position of the additional DMRS may be deployed on an OFDM symbol subsequent to an OFDM symbol used as the basic DMRS. For example, if the basic DMRS is located on the second OFDM symbol, the additional DMRS is deployed on the third OFDM symbol. This has advantages of increasing DMRS resources for the purpose of expanding the number of antenna ports in Multiple-Input Multiple-Output (MIMO) transmission or expanding users performing simultaneous transmission.

The additional DMRS may be categorized as levels according to the number of REs of an added DMRS. The number of REs of the added DMRS, that is, an additional DMRS level, may be adjusted according to a transmission environment. One of multiple additional DMRS levels desirably corresponds to the case in which only a basic RS is transmitted. That is, additional DMRS level 0 may correspond to the case in which only the basic RS is transmitted.

The additional DMRS in units of REs may be deployed at an equal interval in an RB as illustrated in FIGS. 6 and 7. Generally, in the additional DMRS in units of REs, APs having the same number as APs defined in the basic DMRS are defined. However, for a special usage as in the case in which the additional DMRS in units of REs is used to measure a phase variation between OFDM symbols and phase variations are similar in all APs, only the additional DMRS of fewer APs than APs defined in the basic DMRS may be defined.

Herein, the basic DMRS may be referred to as a fundamental DMRS, a primary DMRS, etc. and the additional DMRS may be referred to as a high-quality RS, a high-performance RS, a supplemental DM-RS, a secondary DM-RS, an add-on DMRS, etc. In addition, terms other than DMRS may be used to refer to an RS which can be used to demodulate data/control information.

Method of Varying Density of DMRSs

As a method of varying density of DMRSs, an additional RS may be added on an on-demand basis while maintaining a legacy RS. For example, such an additional RS may be added in the case in which Doppler or delay spread increases or in a high Modulation and Coding Scheme (MCS) according to an MCS level.

As the method of varying density of DMRSs, more RSs may be transmitted or fewer RSs may be transmitted on an on-demand basis to a user that permits density variation according to capability of a receiver. For example, if the receiver is capable of performing analog beamforming, it is requested that fewer RSs be transmitted on an on-demand basis with respect to RSs transmitted on the assumption of omnidirectional reception.

In a channel over which a paging signal, a random access response, and system information are transmitted, density of RSs may be fixed, and in a channel over which information is transmitted to a specific UE, density of RSs may be varied.

RS density control information among grant messages for channel decoding may be defined. That is, information about RS density used in a currently transmitted channel (use of default density, increase of density, or decrease of density) may be provided in the following form.

Information about RS density to be used over a channel to be transmitted (default density or increase/decrease of density)

Information about an additional DMRS level

Information about an additional DMRS type

Triggering message for reporting a channel variation

After performing short-term measurement (CSI-RS), a UE may report a channel variation (of time and frequency) together with Channel State Information (CSI). Reporting of the channel variation may be an index for determining whether to vary RS density. In addition, the UE may report a message for requesting a flexible RS density.

Upon reporting CSI (RI/PMI/CQI), the UE may report information about a preferred additional DMRS level. The preferred additional DMRS level corresponds to an additional DMRS level that can obtain optimal throughput while the UE receives a PDSCH of an MCS corresponding to a reported CQI. Upon calculation of the CSI, the UE may factor in added DM-RS RE overhead according to the additional DMRS level.

When transmission layers increase, an additional RS may be added to a legacy RS.

In a data region indicated by a common control channel or a common control message, it is desirable to basically use an additional DMRS deployed together with a basic DMRS.

When data is indicated by a UE-specific control channel or a UE-specific control message, DMRS density in a subframe is variably used. To this end, a DMRS related indicator may be configured in the control message to indicate DMRS density for a PDSCH or a PUSCH (e.g., through RRC according to DCI or format).

The UE that performs analog reception beamforming may request change of DMRS density.

Figure 8:
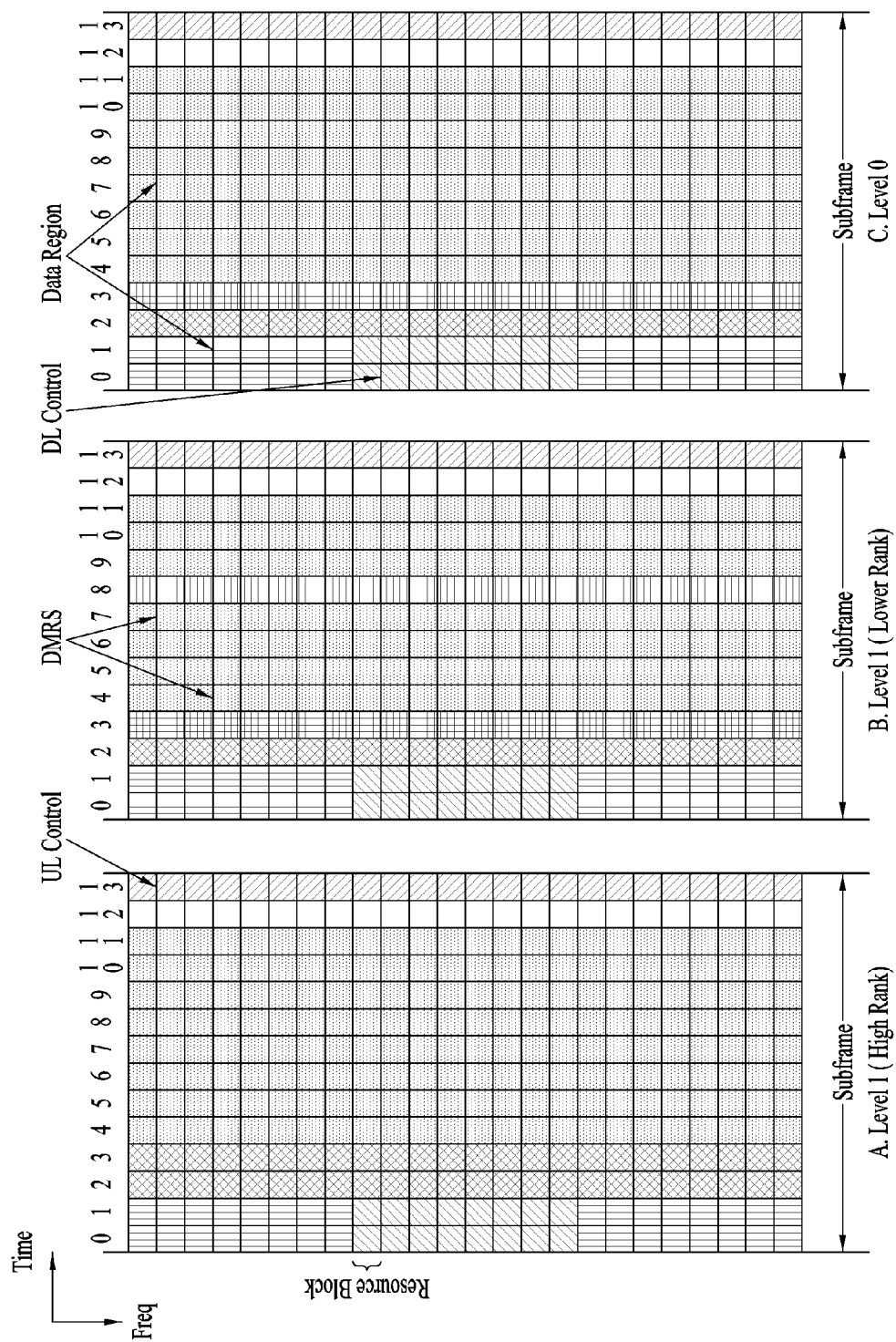
FIGS. 8 and 9 are diagrams for explaining a method of adjusting DMRS transmission density according to an embodiment of the present invention.
Figure 9:
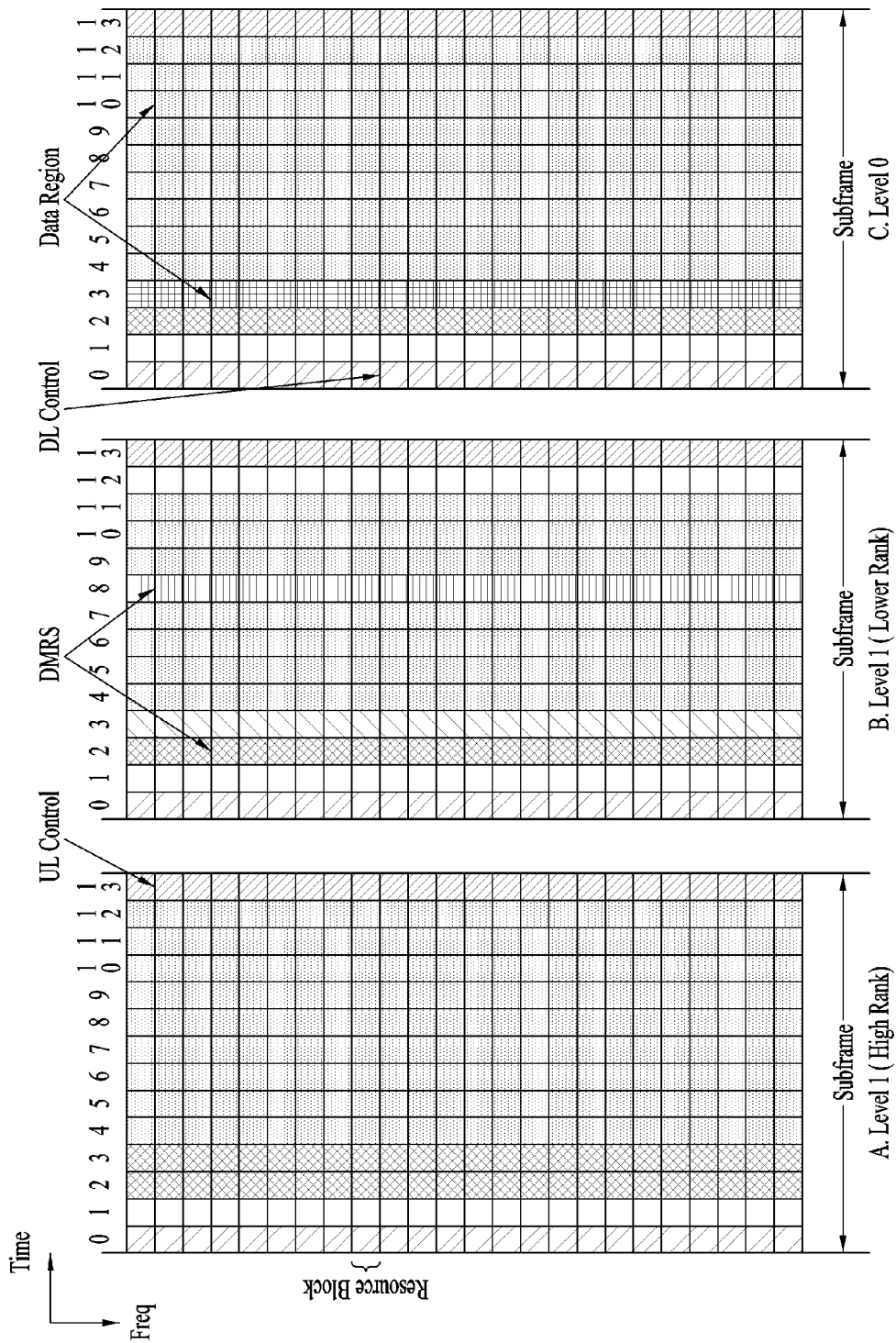

FIGS. 8 and 9 are diagrams for explaining a method of adjusting DMRS transmission density according to an embodiment of the present invention.

Specifically, FIG. 8 is a diagram for explaining a DMRS transmission structure for DL data transmission and FIG. 9 is a diagram for explaining a DMRS transmission structure for UL data transmission.

As illustrated in FIGS. 8 and 9, a Type-2 additional DMRS is categorized into Level 0 and Level 1 according to overhead and the DMRS is used according to each level. In these examples, DMRS positions in UL and DL transmission regions are equalized with each other according to a level of Type-2 additional DMRSs. That is, it is desirable that a DMRS transmission position for DL data transmission not differ from that for UL data transmission according to each level and basic/additional DMRSs be transmitted at the same positions regardless of DL/UL data transmission.

Level 1 corresponds to the case of increasing overhead relative to Level 0 and may be applied for the purpose of improving channel estimation performance during higher rank transmission or lower rank transmission. Level 0 is targeted at lower rank transmission having low RS overhead.

As another example, in FIGS. 8 and 9, "A. Level 1 (Higher Rank)" may be used to improve channel estimation performance during lower rank transmission and "B. Level 1 (Lower Rank)" may be used as a pattern for a higher rank.

FIGS. 8 and 9 exemplarily illustrate frame structures. In the illustrated frame structures, it is assumed that 2 OFDM symbols be used in a DL control region. In a region not used for DL control, DL data transmission or DL data transmission via a guard time may be performed.

Designation of Level That Can Perform Interpolation for Improving Channel Estimation In an embodiment of the present invention, a Quasi Co-Location (QCL) condition may be assumed in DMRSs transmitted as multiple levels. For example, if QCL is assumed between a plurality of DMRSs transmitted in a single subframe, a channel estimated from each DMRS may be used for interpolation. If a QCL condition is assumed in multiple subframes, interpolation may be performed on a multi-subframe level basis. If a mini-subframe is defined in a subframe and a DMRS is transmitted on a mini-subframe basis, interpolation between mini-subframes may be performed when QCL of a mini-subframe level is assumed.

The QCL condition may represent a time-domain resource unit capable of performing interpolation as a subframe group or a multi-subframe group.

RS Structure for Measuring Channel State Variation

If a Cell-specific Reference Signal (CRS), which is periodically transmitted at an interval of constant OFDM symbols, or a CSI-RS, which is periodically transmitted in units of subframes, as in legacy LTE is used, a time-varying channel characteristic may be measured. Meanwhile, in NR, a single-beamformed RS (having no beam variation in time or frequency), which is transmitted in units of some OFDM symbols, like a CRS is not defined.

Since a frame structure supporting dynamic switching of DL/UL and dynamic variation of a transmission beam in units of OFDM symbols and subframes is demanded, it is difficult to periodically transmit a CSI-RS in units of subframes and thus it is difficult to use the periodic CSI-RS. In addition, one-shot transmission makes it difficult to measure Doppler spread.

Even though a periodically transmitted RS for beam measurement is introduced, if the RS is not transmitted at a considerably short period, it is difficult to measure time-varying channel characteristic variation using the beam measurement RS.

Accordingly, a channel measurement RS (e.g., a CSI-RS, a Sounding Reference Signal (SRS), etc.) of NR needs to be designed to be suitable for measurement of time-varying channel state variation.

A signal structure capable of measuring channel state variation is as follows.

Figure 10:
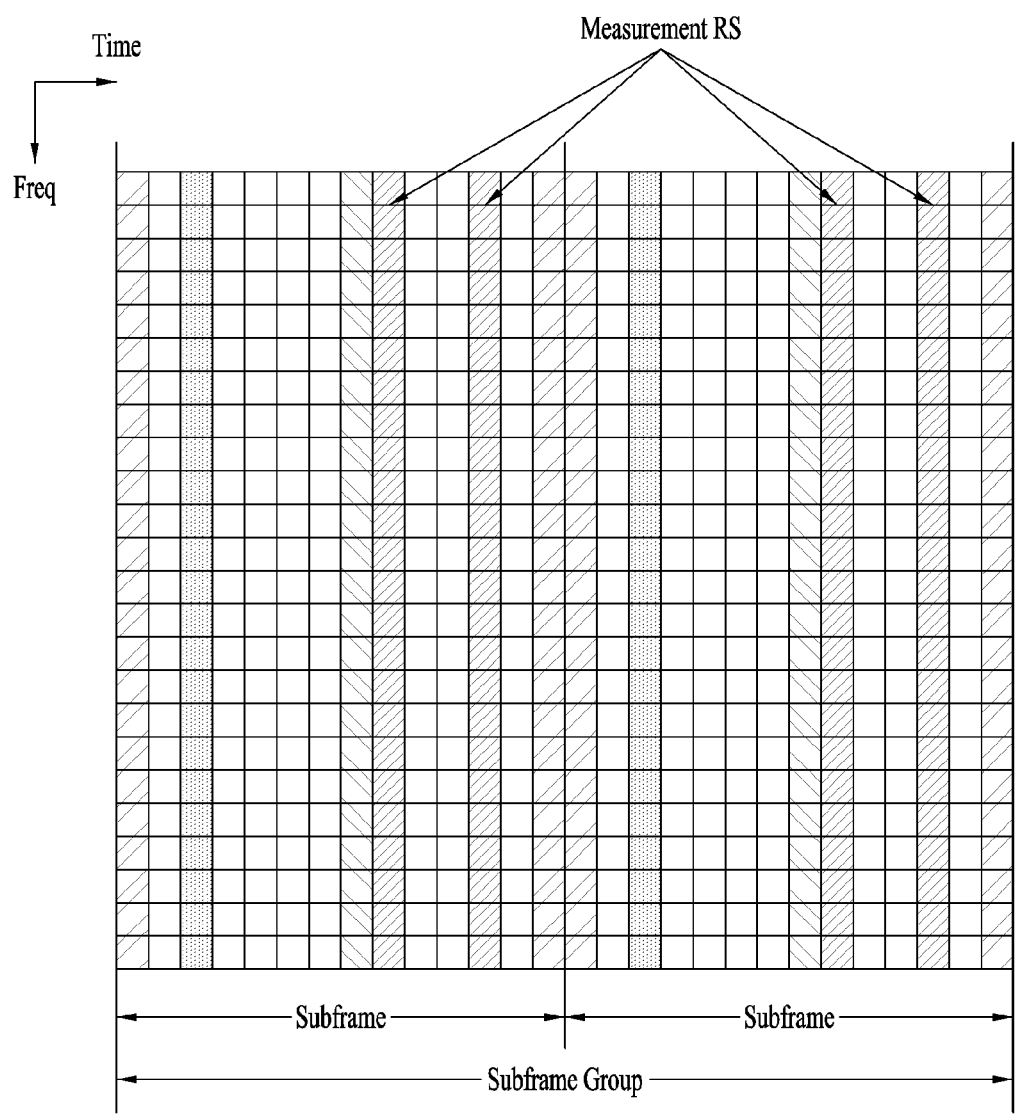
FIG. 10 is a diagram illustrating the concept of a multi-shot measurement reference signal according to an embodiment of the present invention.

FIG. 10 is a diagram illustrating the concept of a multi-shot measurement RS according to an embodiment of the present invention.

A multi-shot CSI-RS or a multi-shot SRS having no variation in beamforming may be transmitted as illustrated in FIG. 10. The multi-shot CSI-RS or SRS may be transmitted throughout multiple shots in a subframe or multiple shots transmitted in units of contiguous subframes or some subframes. A message (e.g., N-subframe group) based on the premise that there is no variation in a beamforming coefficient may be defined. In addition, a repeatedly transmitted structure on a single OFDM symbol may also be considered.

Upon triggering aperiodic CSI-RS transmission/CSI measurement/CSI reporting through DCI, an eNB may inform a UE whether a corresponding CSI-RS is a single shot CSI-RS or a multi-shot CSI-RS. If the eNB transmits the multi-shot CSI-RS, the UE may report channel variation or a preferred additional DMRS level.

Upon triggering aperiodic SRS transmission through the DCI, the eNB may inform the UE whether a corresponding SRS is transmitted as a single shot SRS or a multi-shot SRS. Alternatively, the eNB may inform the UE of how many times an SRS should be consecutively transmitted using the same precoding scheme.

In addition, for efficient interference measurement, a CSI-Interference Measurement (IM) resource, which is a resource for specifying interference, may be configured as a multi-shot CSI-IM resource. The multi-shot CSI-IM resource may be defined to match a multi-shot CSI-RS resource in one-to-one correspondence. That is, the eNB may indicate, through the DCI, how many times the CSI-RS resource and the CSI-IM resource appear. Unlike this, the eNB may individually indicate, through the DCI, how many times each of the CSI-RS resource and the CSI-IM resource appears.

Figure 11:
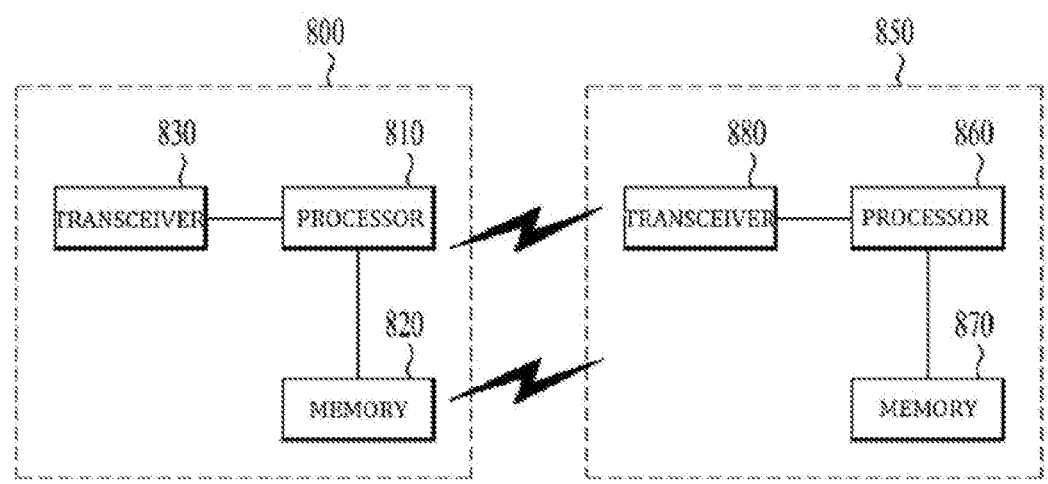
FIG. 11 is a diagram for explaining an apparatus for implementing the above-described method.

FIG. 11 is a diagram for explaining an apparatus for implementing the above-described method.

A wireless apparatus 800 of FIG. 11 may correspond to the above-described specific UE and a wireless apparatus 850 of FIG. 11 may correspond to the above-described eNB.

The UE 800 may include a processor 810, a memory 820, and a transceiver 830 and the eNB 850 may include a processor 860, a memory 870, and a transceiver 880. The transceivers 830 and 880 may transmit/receive a wireless signal and may be implemented in a physical layer of 3GPP. The processors 810 and 860 are implemented in a physical layer and/or a MAC layer and are connected to the transceivers 830 and 880. The processors 810 and 860 may perform the above-mentioned interference control procedure.

The processors 810 and 860 and/or the transceivers 830 and 880 may include an Application-Specific Integrated Circuit (ASIC), a chipset, a logical circuit, and/or a data processor. The memories 820 and 870 may include a Read-Only Memory (ROM), a Random Access Memory (RAM), a flash memory, a memory card, a storage medium, and/or a storage unit. If an embodiment is performed by software, the above-described method may be executed in the form of a module (e.g., a process or a function) performing the above-described function. The module may be stored in the memories 820 and 870 and executed by the processors 810 and 860. The memories 820 and 870 may be located at the interior or exterior of the processors 810 and 860 and may be connected to the processors 810 and 860 via known means.

The present invention described above is applicable to other wireless systems in which various requirements are present in addition to the above exemplary NR system.

The detailed description of the exemplary embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

What is claimed is:

1. A method for receiving uplink signals by a base station (BS) in a wireless communication system, the method comprising:

receiving demodulation reference signals (DMRSs) on a first time domain unit from a user equipment (UE); and receiving uplink data based on the DMRSs on the first time domain unit from the UE, wherein the first time domain unit is located within a second time domain unit, and has less symbols than a number of symbols within the second time domain unit, wherein the DMRSs include (a) a front-loaded DMRS transmitted on a first symbol of the first time domain unit and (b) one or more additional DMRSs transmitted on one or more second symbols of the first time domain unit located after the first symbol, wherein the first symbol corresponds to a starting symbol of the first time domain unit, and wherein the first symbol is different from a starting symbol of the second time domain unit including the first time domain unit.

2. The method of claim 1, wherein the first time domain unit corresponds to a mini-subframe.

3. The method of claim 1, further comprising:

receiving the DMRSs and the uplink data on a third time domain unit from the UE, wherein the DMRSs include (a) a front-loaded DMRS transmitted on a first symbol of the third time domain unit and (b) one or more additional DMRS transmitted on one or more second symbols of the third time domain unit located after the first symbol of the third time domain unit.

4. The method of claim 3, wherein the first symbol of the third time domain unit is different from a starting symbol of the third time domain unit.

5. The method of claim 1, wherein the uplink data is received via a physical uplink shared channel (PUSCH).

6. A base station (BS) in a wireless communication system, the apparatus comprising:

a processor operatively connected to a transceiver, configured to receive demodulation reference signals (DMRSs) on a first time domain unit from a user equipment (UE), and to receive uplink data based on the DMRSs on the first time domain unit from the UE, wherein the first time domain unit is located within a second time domain unit, and has less symbols than a number of symbols within the second time domain unit, wherein the DMRSs include (a) a front-loaded DMRS transmitted on a first symbol of the first time domain unit and (b) one or more additional DMRSs transmitted on one or more second symbols of the first time domain unit located after the first symbol, wherein the first symbol corresponds to a starting symbol of the first time domain unit, and wherein the first symbol is different from a starting symbol of the second time domain unit including the first time domain unit.

7. The apparatus of claim 6, wherein the first time domain unit corresponds to a mini-subframe.

8. The apparatus of claim 6, wherein the processor further controls the transceiver to receive the DMRSs and the uplink data on a third time domain unit, wherein the DMRSs include (a) a front-loaded DMRS transmitted on a first symbol of the third time domain unit and (b) one or more additional DMRS transmitted on one or more second symbols of the third time domain unit located after the first symbol of the third time domain unit.

9. The apparatus of claim 8, wherein the first symbol of the third time domain unit is different from a starting symbol of the third time domain unit.

10. The apparatus of claim 6, wherein the uplink data is received via a physical uplink shared channel (PUSCH).

* * * * *